(12) United States Patent
Malik

(10) Patent No.: US 7,346,696 B2
(45) Date of Patent: Mar. 18, 2008

(54) GROUP ACCESS MANAGEMENT SYSTEM

(75) Inventor: Dale W. Malik, Dunwoody, GA (US)

(73) Assignee: AT&T Deleware Intellectual Property, Inc., Wilmington, DE (US)

( * ) Notice: Subject to any disclaimer, the term of this patent is extended or adjusted under 35 U.S.C. 154(b) by 822 days.

(21) Appl. No.: 10/217,916

(22) Filed: Aug. 13, 2002

(65) Prior Publication Data

US 2003/0220975 A1 Nov. 27, 2003

Related U.S. Application Data

(60) Provisional application No. 60/382,106, filed on May 21, 2002.

(51) Int. Cl.
*G06F 15/16* (2006.01)
*G06F 7/00* (2006.01)

(52) U.S. Cl. .......................................... 709/229; 707/9
(58) Field of Classification Search .................... 707/9, 707/10, 103; 709/225, 229
See application file for complete search history.

(56) References Cited

U.S. PATENT DOCUMENTS

| | | | |
|---|---|---|---|
| 5,276,901 A * | 1/1994 | Howell et al. ................. | 707/9 |
| 5,721,906 A | 2/1998 | Siefert | |
| 5,761,669 A | 6/1998 | Montague et al. .......... | 707/103 |
| 5,793,365 A | 8/1998 | Tang et al. | |
| 5,884,172 A | 3/1999 | Sawyer ....................... | 455/435 |
| 5,926,816 A | 7/1999 | Bauer et al. | |
| 5,941,947 A * | 8/1999 | Brown et al. ............... | 709/225 |
| 5,991,807 A * | 11/1999 | Schmidt et al. ............. | 709/225 |
| 6,038,563 A * | 3/2000 | Bapat et al. .................. | 707/10 |
| 6,085,191 A * | 7/2000 | Fisher et al. ................. | 707/9 |
| 6,182,142 B1 | 1/2001 | Win et al. | |
| 6,189,036 B1 * | 2/2001 | Kao ............................ | 709/229 |
| 6,192,361 B1 * | 2/2001 | Huang ......................... | 707/9 |
| 6,233,618 B1 | 5/2001 | Shannon | |
| 6,236,996 B1 * | 5/2001 | Bapat et al. .................. | 707/9 |
| 6,275,825 B1 * | 8/2001 | Kobayashi et al. ........... | 707/9 |
| 6,311,205 B1 * | 10/2001 | Dutcher et al. ............. | 709/201 |
| 6,366,915 B1 | 4/2002 | Rubert et al. | |
| 6,381,579 B1 * | 4/2002 | Gervais et al. .............. | 705/8 |
| 6,405,035 B1 | 6/2002 | Singh | |
| 6,405,202 B1 * | 6/2002 | Britton et al. ............... | 707/9 |

(Continued)

OTHER PUBLICATIONS

Patent Application entitled: Instant Messaging Architecture and System for Interoperability and Presence Management; filed Apr. 29, 2002; U.S. Appl. No. 10/135,929.

*Primary Examiner*—William Vaughn
*Assistant Examiner*—Yemane M. Gerezgiher
(74) *Attorney, Agent, or Firm*—Thomas, Kayden, Horstemeyer & Risley, LLP

(57) ABSTRACT

A system for limiting group access is provided. A representative system includes a group access management system operable to store a plurality of resource lists, the resource lists comprising at least one contact and at least one group comprising at least one member and further comprising a group class of service marker associated with the at least one group. The system further comprises a network service router coupled to the group access management system and being operable to route a service request, if the service request includes an adequate class of service marker with respect to the group class of service marker. Methods and other systems for limiting group access are also provided.

43 Claims, 6 Drawing Sheets

U.S. PATENT DOCUMENTS

| | | | |
|---|---|---|---|
| 6,408,336 B1 * | 6/2002 | Schneider et al. | 709/229 |
| 6,415,318 B1 | 7/2002 | Aggarwal et al. | |
| 6,453,353 B1 | 9/2002 | Win et al. | |
| 6,487,667 B1 | 11/2002 | Brown | |
| 6,510,466 B1 | 1/2003 | Cox et al. | |
| 6,564,261 B1 | 5/2003 | Gudjonsson et al. | |
| 6,601,009 B2 | 7/2003 | Florschuetz | |
| 6,604,133 B2 | 8/2003 | Aggarwal et al. | |
| 6,677,968 B1 | 1/2004 | Appelman | |
| 6,697,806 B1 * | 2/2004 | Cook | 707/10 |
| 6,785,728 B1 * | 8/2004 | Schneider et al. | 709/229 |
| 6,820,082 B1 * | 11/2004 | Cook et al. | 707/9 |
| 6,870,830 B1 | 3/2005 | Schuster et al. | |
| 6,874,061 B1 | 3/2005 | Bridge | |
| 6,935,951 B2 | 8/2005 | Paulsen et al. | |
| 7,016,978 B2 | 3/2006 | Malik et al. | |
| 2002/0035605 A1 | 3/2002 | McDowell et al. | |
| 2002/0069247 A1 | 6/2002 | Paknad et al. | |
| 2002/0083134 A1 | 6/2002 | Bauer et al. | |
| 2002/0087678 A1 * | 7/2002 | Padilla | 709/223 |
| 2002/0087704 A1 | 7/2002 | Chesnais et al. | |
| 2002/0102965 A1 | 8/2002 | Mandahl et al. | |
| 2002/0112054 A1 | 8/2002 | Hatanaka | |
| 2002/0118809 A1 | 8/2002 | Eisenberg | |
| 2002/0130904 A1 | 9/2002 | Becker et al. | |
| 2002/0184357 A1 * | 12/2002 | Traversat et al. | 709/223 |
| 2003/0018726 A1 | 1/2003 | Low et al. | |
| 2003/0023476 A1 | 1/2003 | Gainey | |
| 2003/0041000 A1 | 2/2003 | Zajac et al. | |
| 2003/0041154 A1 * | 2/2003 | Tran | 709/229 |
| 2003/0065721 A1 * | 4/2003 | Roskind | 709/204 |
| 2004/0003132 A1 | 1/2004 | Stanley et al. | |
| 2004/0064332 A1 | 4/2004 | Zou et al. | |
| 2004/0093595 A1 | 5/2004 | Bilange | |
| 2004/0128245 A1 | 7/2004 | Neal et al. | |
| 2004/0148228 A1 | 7/2004 | Kwei | |
| 2005/0021467 A1 | 1/2005 | Franzdonk | |
| 2005/0164783 A1 | 7/2005 | Paulsen et al. | |
| 2005/0165817 A1 | 7/2005 | O'Conor | |
| 2005/0210263 A1 | 9/2005 | Levas et al. | |

* cited by examiner

GROUP ACCESS MANAGEMENT SYSTEM

CROSS-REFERENCE TO RELATED APPLICATION

This application claims priority to now abandoned U.S. provisional application entitled, "INTEGRATION OF INSTANT MESSAGING AND COMPUTER OPERATING SYSTEMS," having Ser. No. 60/382,106, filed May 21, 2002, which is entirely incorporated herein by reference.

FIELD OF THE INVENTION

The present invention is generally related to telecommunications and more particularly to services provided to clients via instant messaging applications.

DESCRIPTION OF THE RELATED ART

The development of the internet has driven vast technological developments, particularly in the areas of networking hardware and software. Networking hardware developments have enabled networks to transfer large files in fractions of a second. Software developments, such as the world-wide-web (web) and e-mail, have facilitated communications over these networks that have allowed users to remain in almost constant contact with work. These types of communications have become of utmost importance in the business setting, where response time has become a key survival factor for many companies. Other networking software has allowed users to access and run applications from remote locations, thus enabling a businessperson to remain more productive, even on a business trip.

Moreover, the internet has changed the way people communicate. E-mail has become the dominant means of communications in many settings, being preferred over traditional mail, and even telephones in some cases. Almost instantaneous communication with little charge has driven much of the popularity of e-mail. Once used only in university and military settings, e-mail has gained widespread public acceptance.

In a world economy based largely upon communication, the relative speed of e-mail in comparison to traditional mail is often not fast enough or as effective. Demand for faster access to more information has resulted in the development of a number of instant messaging (IM) services. IM brings presence information into the communications arena, and it allows users to have real-time chat sessions with other users who are present on the system. The real-time nature of IM has led to quick acceptance by many in the business community of IM as an invaluable tool for communication. However, current IM systems often have administration and management problems.

Therefore, there is a need for systems and method that address these and/or other perceived shortcomings of the prior art.

SUMMARY OF THE INVENTION

One embodiment, among others, of the present invention provides systems and methods for a limiting group access. A representative system includes a group access management system operable to store a plurality of resource lists, the resource lists comprising at least one contact and at least one group comprising at least one member and further comprising a group class of service marker associated with the at least one group. The system further comprises a service router coupled to the group access management system and being operable to route a service request, if the service request includes an adequate class of service marker with respect to the group class of service marker.

A method, among others, for managing group access includes: creating a group comprising at least one member; storing the group in a group access management system; and assigning a class of service level to the group.

A method, among others, for adding a group to a user resource list includes: sending a request to add a group to a user resource list; providing a class of service marker; and adding the group to the user resource list if the class of service marker allows the group to be added.

Other systems, methods, features, and advantages of the present invention will be or become apparent to one with skill in the art upon examination of the following drawings and detailed description. It is intended that all such additional systems, methods, features, and advantages included within this description and within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the present invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1A:
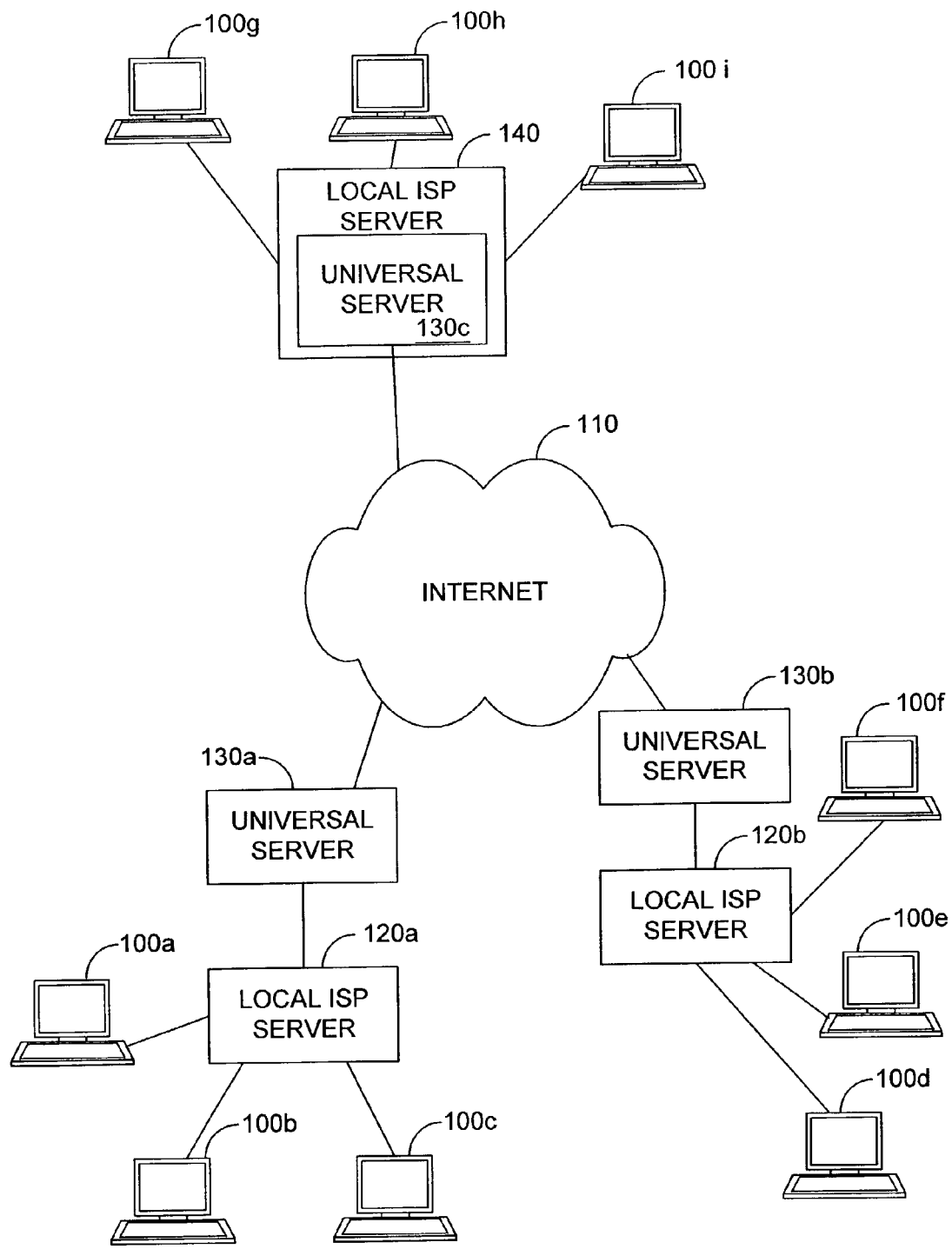
FIG. 1A is a block diagram illustrating an interoperability architecture for instant messaging used in one embodiment, among others, of the present invention.

Referring now to FIG. 1A, shown is a block diagram illustrating an interoperability architecture for instant messaging used in one embodiment, among others, of the present invention. Each of a plurality of remote computers 100*a-i* access a network 110 through a local internet service provider (ISP) server 120*a*, 120*b*, 140. The local ISP 120*a*, 120*b*, 140 can offer network 110 access through myriad connection types, including a digital subscriber line (DSL) service, an integrated services digital network (ISDN) service, an analog dial-up service, ethernet, T-1, or any other service for transmitting data through a network 110. Universal servers 130*a-c* are located between the internet and each of local ISP servers 120*a*, 120*b*, and located inside local ISP 140. These universal servers 130*a-c* provide interoperability between a plurality of proprietary instant messaging clients 100*a-i*. Of course, the scope of the presentation includes networks other than those with universal servers or instant messaging.

Figure 1B:
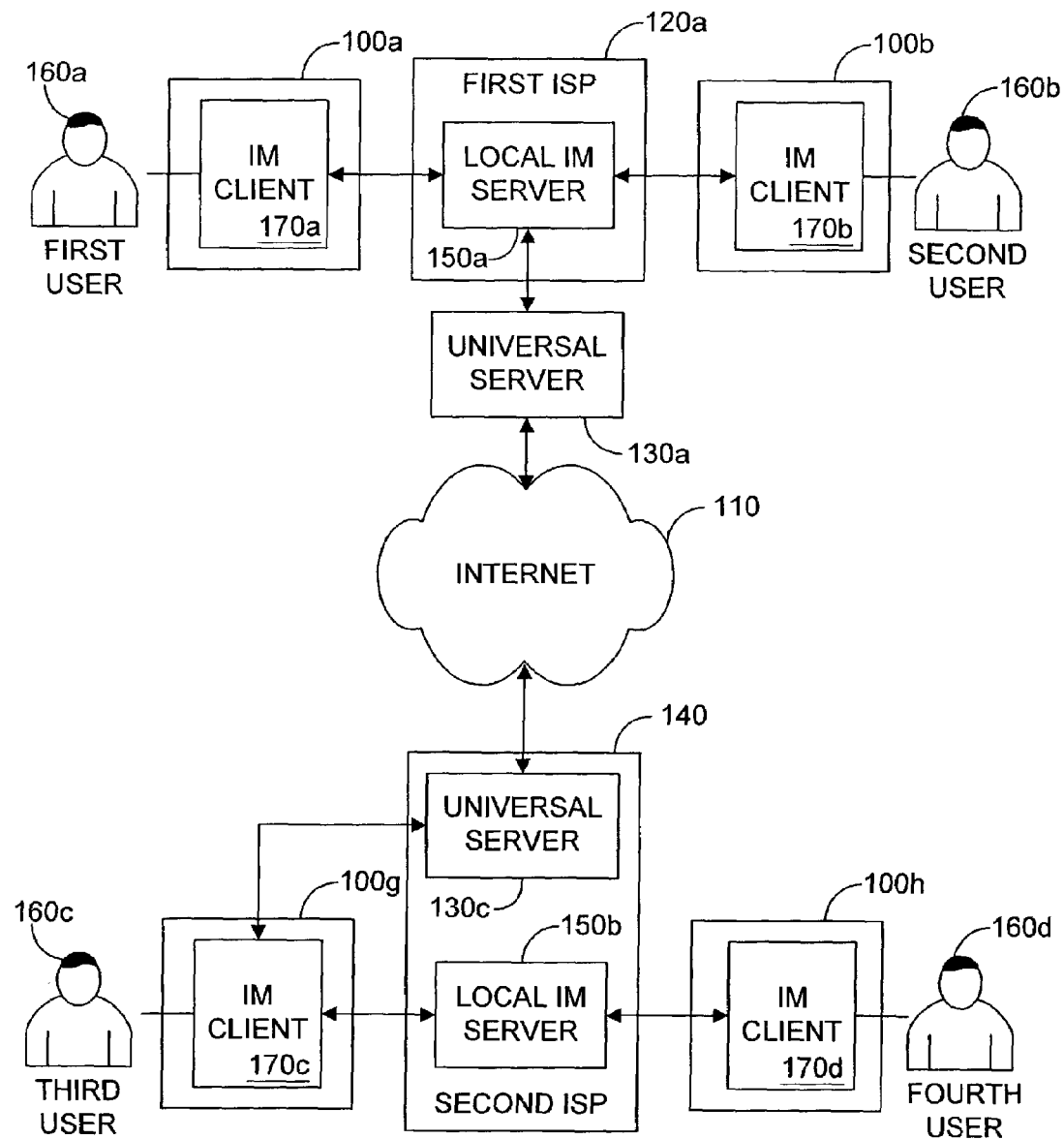
FIG. 1B is a block diagram illustrating an alternative embodiment, among others of an interoperability architecture for instant messaging used in one embodiment, among others, of the present invention.

Referring now to FIG. 1B, shown is an illustration of an alternative embodiment, among others, of a universal architecture. Greater detail regarding this interoperability architecture may be found in U.S. patent application Ser. No. 10/135,929, entitled "Instant Messaging Architecture and System for Interoperability and Presence Management," which is hereby incorporated by reference. The universal architecture uses a universal protocol, such as the extensible markup language (XML) protocol to allow users of different ISPs 120*a*, 140 that use proprietary protocols to communicate with one another. Universal servers 130*a*, 130*c* located at each of the ISPs 120*a*, 140 are the key feature of the universal architecture. FIG. 1B illustrates two separate ISP networks 120*a*, 140. The discussion of the ISP 120*a*, 140 will be limited to the components that provide the universal service.

The ISP 120*a* contains a local IM server 150*a*, and is connected to the universal server 130*sa*. The local IM server 150*a* provides the standard IM function for the ISP 140*a*. The universal server 130*a* provides the universal function that allows the first user 160*a*, who is registered with the first ISP 120*a*, to communicate with a second user 160*b* registered with the second ISP 140. The first ISP 120*a* provides connections to a plurality of clients 170*a*, 170*b* on computers 100*a*, 100*b*, which allows users 160*a*, 160*b* to access the proprietary IM and universal functions of the ISP 120*a*. The first ISP 120*a* is "bimodal," in that it uses both a proprietary and universal format to provide a proprietary IM function that only allows the users who are registered with the ISP 120*a* to send and receive instant messages. For example, if only one user has registered with the universal server 130*a*, then the local IM server 150*a* will transfer instant messages between the first and second users 160*a*, 160*b* using the proprietary protocol. However, if both the first and second users 160*a*, 160*b* are registered with the universal server 130*a*, then the first ISP 120*a* can transfer instant messages between them using the universal protocol. By supporting both formats at the first ISP 120*a*, users can migrate to the universal format over time. When all users 160*a*, 160*b* have migrated the proprietary format can be discontinued.

The universal server 130*a* removes the restrictions associated with proprietary IM functions associated with the ISP 120*a*. The universal server 130*a* uses a universal format, such as XML, or any other suitable format, that allows users 160*a*, 160*b* registered with an ISP 140*a*, such as BellSouth DotNet, to send and receive instant messages from other users 160*c*, 160*d* registered with another ISP 140*b*, such as America Online (AOL).

The user 160*a* accesses the local IM server 150*a* of the ISP 120*a* through the IM client 170*a* located on the user's computer 100*a*. The IM client 170*a* typically includes a proprietary software program that is capable of opening communications sockets that allow the IM client 170*a* to communicate with the local IM server 150*a* using either the proprietary or universal protocols. The software program is capable of formatting an instant message sent from the IM client 170*a* to the appropriate format used by the IM function of the ISP 120*a*. In this manner, the user 170*a* is capable of communicating with any other user 160*b* registered with the ISP 120*a*. However, the local IM server 150*a* on a first ISP 120*a* is also connected to a first universal server 130*a*. The first universal server 130*a* is in turn, connected to a second universal server 130*b* on the second ISP 140*b* via a distributed network, such as the internet 110. This allows the user 160*a* to communicate not only with the user 160*b* who is registered with the first ISP 120*a*, but also with users 160*c* who are registered with the second ISP 140 that uses a different proprietary IM protocol to send and receive instant messages within the network of the second ISP 140.

In order for the first user 160*a* to be able to send and receive messages with a third user 160*c* on the second ISP 140, the IM client 170*a* must be able to identify the IP address and presence information associated with the third user 160*c*. The presence information for the third user 160*c* is stored on the universal server 130*a* connected to the first ISP 120*a*. The universal server 130*a* on the first ISP 120*a* stores the IP address and presence information for the third user 160*c*. Therefore, the first user 160*a*, who is registered with the universal server 130*a* on the first ISP 120*a* has access to the IP address and presence information of the third user 160*c*.

One skilled in the art will recognize the difference between the first local ISP 120*a* and the second ISP 140. The second local ISP 140 is an alternative embodiment that includes within the ISP 140 both the universal server 130*c* and a local IM server 150*b*. Here, the local IM server 150*b* does not communicate with the universal server 130*c*. Thus, the first user 160*a* will not be able to communicate with a fourth user 160*d* if the fourth user 160*d* is not registered with the universal server 130*b*, but instead is only registered with a local IM server 150*b*. As a result, the fourth user 160*d* is able to send and receive instant messages using only the proprietary format over local IM server 150*b*. Therefore, the user 160*d* is limited to communicating via instant messages with users of the second ISP 140*b*, such as the third user 160*c*.

An advantageous feature of the universal architecture is that it is designed to be easily integrated within existing ISPs 120*a*, 140, such as AOL and Microsoft Network (MSN) without disrupting the current IM function of these ISPs 120*a*, 140. Each ISP 120*a*, 140 that adopts the universal architecture requires only a slight modification to the existing network. The ISP 120*a*, 140 either adds a universal server 130*a* between the local IM server 150*a* and the internet 110, or adds an additional server to function as the universal server 130*b* and can install a universal application program on the local IM server 150*a*, 150*b* and each IM client 170*a-d* attached to the network. The universal application program that is installed at each ISP 120*a*, 140 converts the ISP 120*a*, 140 to function as "bimodal." That is, the ISP 120*a*, 140 is capable of using the proprietary IM protocol of the local IM server 150*a*, 150*b* and the universal protocol of the universal architecture. The bimodal nature of the universal architecture allows the universal server 130*a*, 130*b* to be implemented into existing ISPs 120*a*, 140 such as AOL and MSN without disrupting the current proprietary IM functions of those services. This allows the current users 160*a-d* to continue using the proprietary IM function of their particular ISP 120*a*, 140 until every user 160*a-d* can be converted to the universal protocol.

Figure 2:
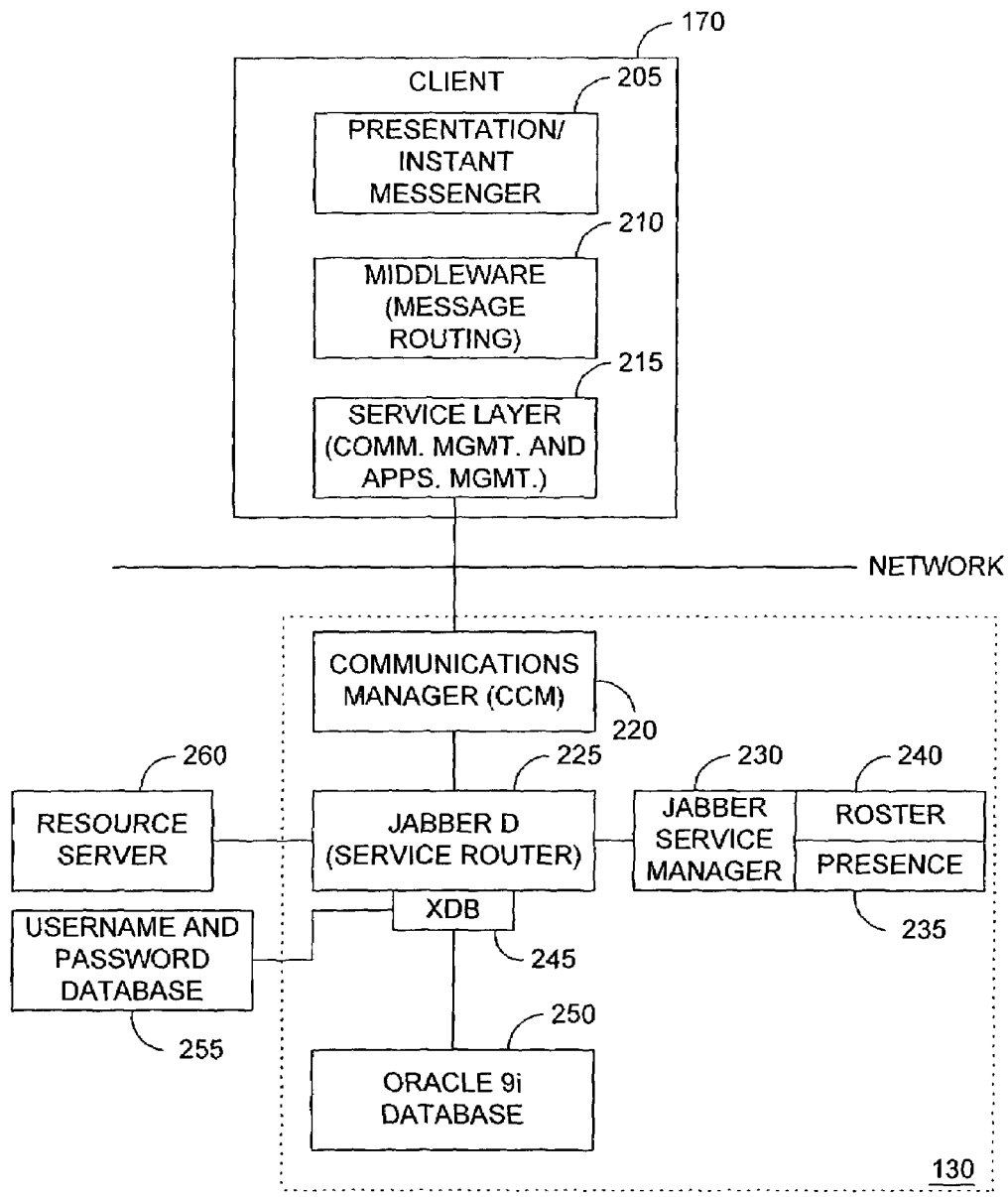
FIG. 2 is a block diagram of the interoperability architecture used in one embodiment, among others, of the present invention.

Referring now to FIG. 2, shown is a block diagram illustrating an embodiment, among others, of the universal server 130 of FIGS. 1A & B, which is used in conjunction with an embodiment, among others, of the present invention. The client 170 includes at least three layers of functionality in one embodiment, among others, to communicate with the universal server 130. The first layer is the presentation layer 205. The presentation layer 205 includes the logic that is used to present the instant messenger or another application to a user. The second layer is a middleware layer 210. The middleware layer 210 includes logic used to handle the message routing of the instant messaging application between the presentation layer and the service layer. The third layer is the service layer 215. The service layer 215 handles both the applications management and communications management of the client. The service layer 215 communicates with the communications layer 220 on the universal server 130.

Preferably, there are three basic layers to the instant messaging service. The first layer is the communications manager (CCM) 220. The communications manager 220 manages the connections between the client communications manager 215 and the universal server 130. In one embodiment, among others, of the universal server 130, communications between the client service layer 215 and the universal server 130 communications manager 220 occur in extensible markup language (XML). Further, the communications may be secure socket layer (SSL) encrypted for security. Moreover, the communications can be compressed by a compression/decompression algorithm implemented on a compression-decompression module, more commonly referred to as a CODEC, to provide faster data transfer.

The communications manager 220 includes a number of connection sockets between the communications manager 220 and a plurality of users. The communications manager 220 can further include a load balancer (not shown) to balance the connections over a number of different communications managers. The load balancer can maintain a connection to the same connection socket during the period while the user is logged on and connected to an operable communications manager 220, and can automatically connect the user to an alternate connection socket when a communications manager might fail. Thus, a continuous connection can be maintained during an active session despite hardware failures. The load balancer can also protect the server against denial of service attacks, which have become increasingly prevalent on the internet.

A standard communications manager 220 will typically attempt to recover and reallocate a connection socket after a period of time with no activity from the client 170. In this situation the communications manager 220 assumes that the client is no longer present on the system. However, because presence is an important piece of the instant messaging architecture, the communications layer 215 on the client-side sends a signal to the universal server 130 to keep the connection socket active on the communications manager 220.

The second layer is the service router 225, with one example known as a JabberD in the Jabber architecture, such as that available from Jabber, Inc. of Denver, Colo., which performs a similar function to the message router 210 on the client side of the network. A number of different service managers 230 can be coupled to the service router 225, each of which can provide a different service to the client 170 over the internet. Thus when a service is requested, the service router 225 routes the request to the requested service manager 230. In the instant messaging architecture the service manager 230 is a Jabber service manager (JSM) which allows text communication between parties. The JSM 230 also keeps track of presence and roster information 235, 240, respectively, for a particular user on the network who has logged into the instant messaging system. Presence 235 typically refers to the user's status on the network, while roster 240 typically refers to the status on the network of those on the user's resource list.

Similarly to the communications manager 220, the service router 225 can utilize a self-similar architecture using the CODEC (not shown) and load balancer (not shown) to optimize the connection between the communications manager 220 and the service router 225. Use of the CODEC enables high speed data transmission between the communications manager 220 and the service router 225. The load balancer provides a robustness that allows the client to maintain contact with a selected service manager 230 during a session.

In one embodiment, among others, of the universal server 130, the database containing the non-persistent data, such as presence and roster information 235, 240, can be severed from the service manager 230. The presence information 235 typically includes a list of all users who are registered with the universal server 130, while the roster list includes a non-persistent list of those resource which are present on the network. Thus, the non-persistent data can be maintained and updated at a single database, and the plurality of service routers 225 can connect to the same presence information 235. After severing this database from the service manager 230 the service manager 230 can be equipped, as described above, with a CODEC (not shown) and load balancer (not shown), again utilizing a self-similar architecture to provide quality of service and communication efficiencies.

The service router 225 is further coupled, in one embodiment, among others, to an XML database (XDB) library 245. The XDB library 245 is used as a translator such that the service router 225 can communicate with a database system 250 that includes persistent data relating to a plurality of clients. The database system 250 which contains most of the persistent data for the services on the network, such as resource lists, preferences, etc. In one embodiment, among others, of the universal server 130 the database system 250 can be an Oracle 9i database. The XDB library 245 can be further coupled to an authentication server, such as a username and password database 255. Thus a username and password can be required before the user is authenticated and allowed to access the database system 250 for any profile information.

After registering with the database system 250, the user is provided with a resource list. The client 170 can then contact the service manager 230 to find out which of the resources on the resource list is present and/or available on the network. Typically, presence refers to the registration state of a client 170. If a client 170 is logged-in to the network, the client 170 is present on the network. Typically, availability refers to the status of a user at the client computer. A user can be made unavailable by the network if there has been no activity on the client computer 170 for a period of time. Otherwise, a client 170 can be made unavailable by user choice, if the user does not wish to be disturbed. One skilled in the art will recognize that these are merely definitions of various states that can be defined according to any specific implementation of the presence and roster databases 235, 240. Furthermore, these databases 235, 240 that contain non-persistent information could keep track of any other states that might be defined by the specific implementation of the service manager 230.

Typically with respect to other instant messaging systems, the resource list only comprises a list of other users for which the client 170 wishes to know the status. However, the resource list of some embodiments of the present invention could include access to a plurality of applications, and there could be multiple service managers that include managers for the plurality of applications coupled to the service router 225. These service managers could provide access to a multitude of different applications and resources, such as Microsoft Word and/or Visio, provided by Microsoft Corp. of Redmond, Wash., and/or billing entry applications, etc. Moreover, the Jabber service manager 230 could keep track of the presence of these other applications and other resources on the network. For example, if a client wished to access an e-mail account from a remote location and the system was down, the Jabber service manager 230 could alert the user that the server was down. Thus the client 170 would not waste resources searching and waiting for e-mail from a server that is off-line.

Thus, the Jabber instant messenger can be used similarly to an operating system. When a resource server 260 is present on the network, the resource(s) associated with that resource server can be displayed as an icon on the client computer display, and when a resource server is down, the resource(s) can be removed from the client computer 170 display. Thus, icons, for example, could appear and disappear from a client computer 170 display as they become present and available, and not present or unavailable. Selecting the icon while it is displayed will cause a routing request to be sent to the service router 225. Upon receiving the routing request, the service router 225 will determine the correct routing of the routing request and deliver the proper service to the client computer 170.

Figure 3:
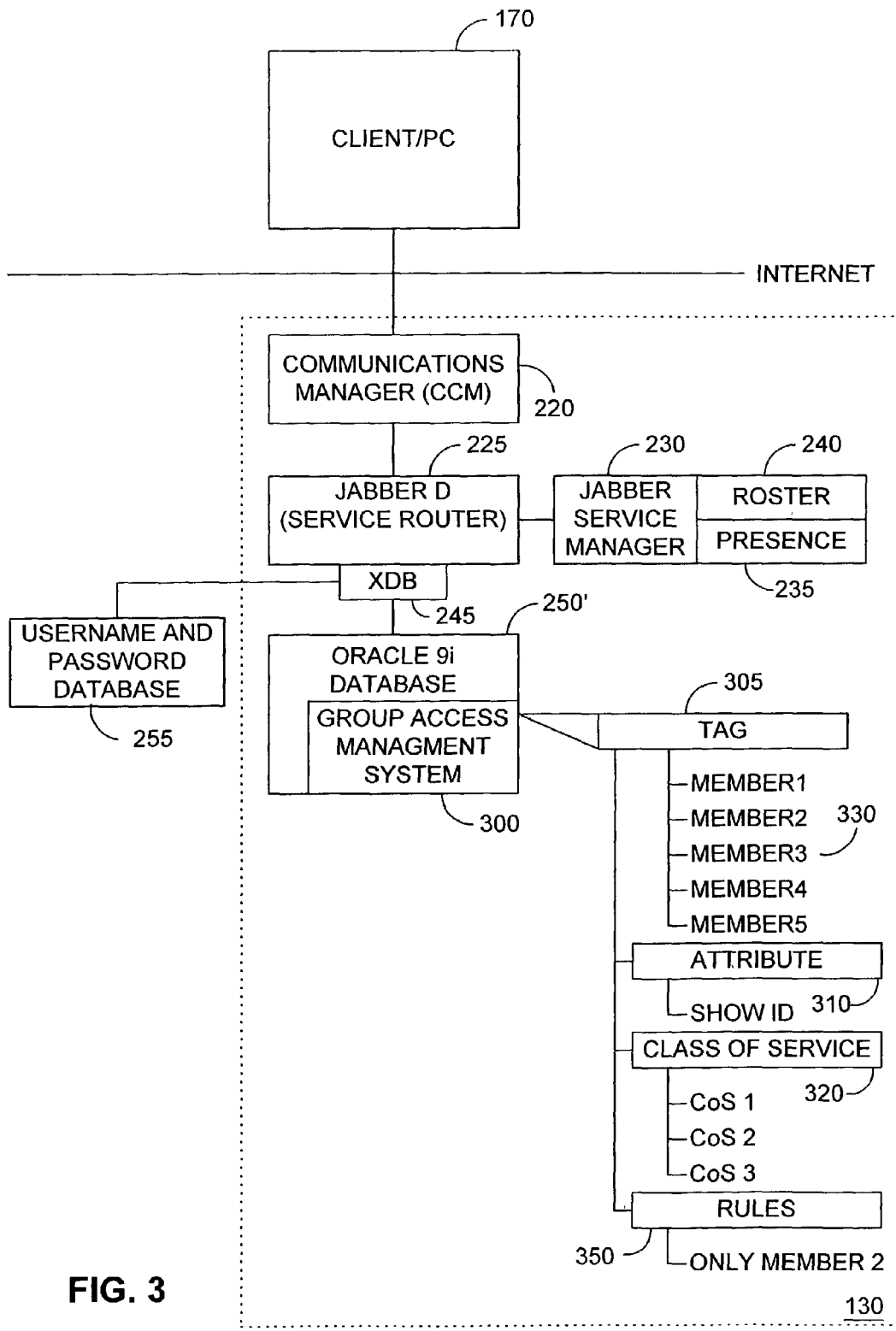
FIG. 3 is a block diagram of a one embodiment, among others, of a system of the present invention for managing group.

Referring now to FIG. 3, shown is an embodiment, among others, of the universal server including an embodiment of a group access management system 300 for creating and editing groups. This group access management system 300 allows an administrator to create group lists 305, and push the group lists 305 into a client profile or class of service to be displayed on the client 200. Thus a group 305 can be created to be displayed on every client 170 with a certain class of service level or every client 170 to whom a database 250' administrator desires the group 305 to be shown. This system would help the database 250' administrator in the creation of newsgroups, for example.

The administrator creating the group 305 would be allowed to set extra field markers such as attribute 310 or class of service 320 that allow only members 330 of the group 305 or members of a certain class of service level to access the group. Thus when a user that is not included on the list of members 330 and does not have a class of service marker 320 that allows the user to add the group 305, the user will have to wait for authorization before the group 305 is posted to the user's resource list.

Further, the administrator can designate certain groups to be public groups according to the attribute field. When a group is designated a public group, all users of the system will be allowed to view the public group and add a number of these public groups to their resource list, regardless of the user's respective class of service level. Using this attribute field, a user could request that the universal server 130 provide a list of all public groups. The universal server 130 could then mask off all of the private group lists (filtering out all of the private groups), such that the user would be allowed to view only the public groups. Moreover, a user could search all groups and be allowed to view the public groups in addition to those groups to which the user's class of service level allows access.

One skilled in the art will recognize that this administrative application tool can override the class of service accessibility discussed in the provisional application above with respect to the service router 225. Thus, an administrator can mask a group 305 from a user who may technically have access to two different service center groups by providing that only one of the service center groups be available to that user.

Figure 4:
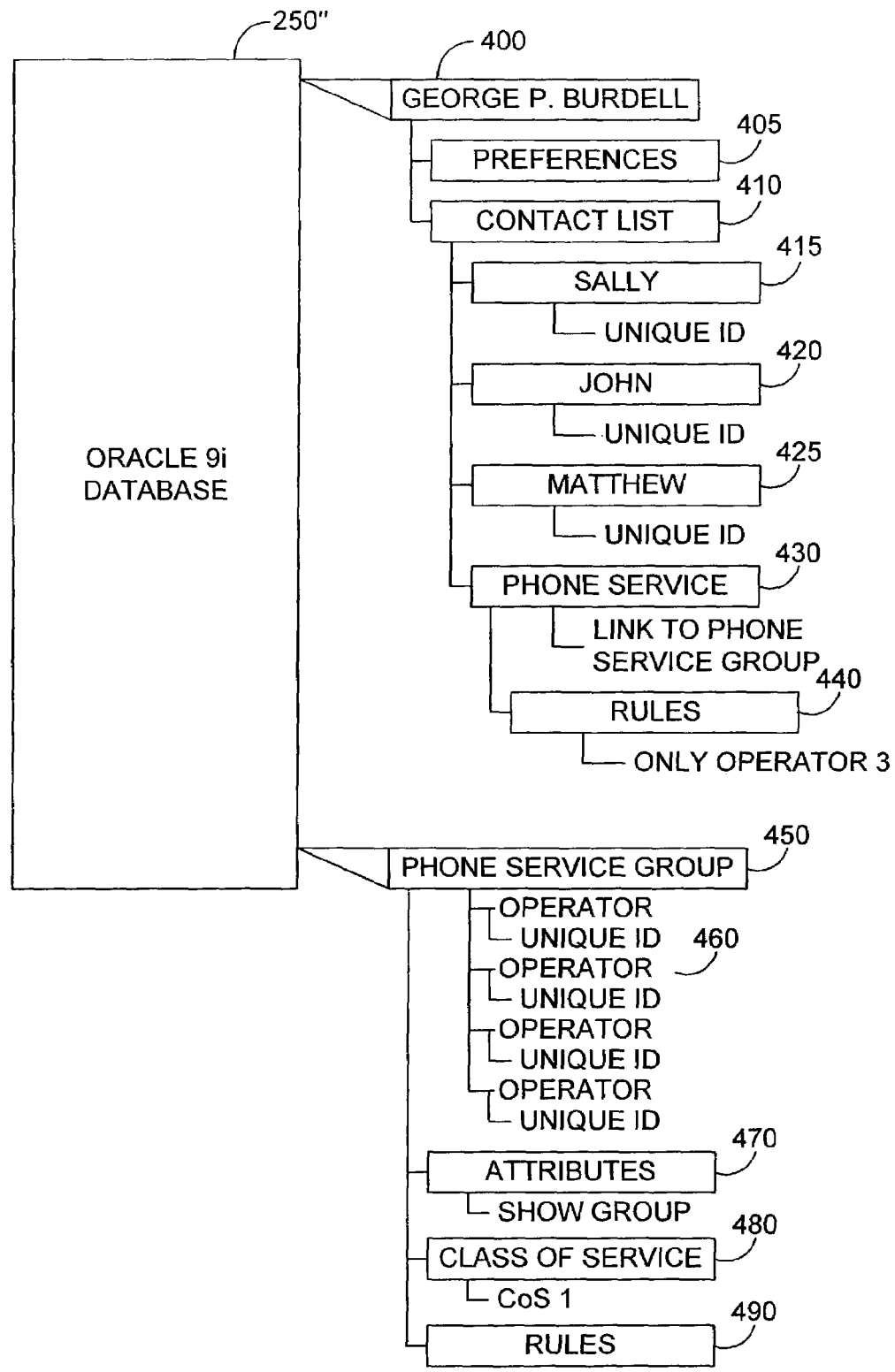
FIG. 4 is an embodiment, among others, of a data structure for storing a group and facilitating the use of the system of FIG. 3.

Referring now to FIG. 4, shown is a data structure, illustrating the organization of the group from FIG. 3 within a particular user's profile. The persistent database 250" has a plurality of records 400 that are associated with various users of the universal server 130 (FIG. 3). Each of these records 400 contain a plurality of fields, including, but not limited to preferences 405 and resource lists 410. In turn, the resource list 410 comprises a plurality of contacts 415, 420, 425, 430. Each of these contacts 415, 420, 425, 430 includes a link to a unique identifier identifying a user associated with the each of the contacts 415, 420, 425, 430.

However, in the present invention, a group contact 430 may be added to the resource list. The group contact 430 can in one embodiment, among others, contain a link to a public or private group 430, that may be created centrally by a database 250" administrator, or an individual user. In turn the database 250, in one embodiment, among others, could store the group 450 centrally, without requiring each user to separately store the group list 450. Referring back to the user's resource list, the phone service group listing 430 could further include a rule 440 for the group. The rule could be used to indicate presence of the group 430 when a particular member 460 or subset of the group is present and available. The rule could be set by the user, but could also be set automatically by the universal server 130 upon addition of the group 430 to the resource list 410.

Now referring back to the centralized group list 450, the group list 450 can include a plurality of users 460, such as, for example, but not limited to, operators. Each of the individual users 460 would be linked to a unique identifier, which would allow two users to use the same "handle," being differentiated by a unique identifier. Further, the group list 450 could include other fields such as, for example, but not limited to, attributes 470, class of service 480, and rules 490.

The attributes field 470 could consist of a marker which indicates the viewability of the group 450 with respect to the users of the universal server 130. The attributes 470 can be set such that every user of the universal server 130 can view the group 450, or so that it is not viewable to every user. This field 470 can be useful in creating private groups, such that only certain users or that no users may view the group 450.

The class of service field 480 can be used to create a group 450 which cannot be added to the resource list 410 of users without the required class of service marker. Thus, for example, if the group 450 is classified as class of service 1, and the user has class of service 2, the user would not be able to add the group 450 to the user's resource list 410. This class of service marker 480 provides a tool by which the database 250" administrator can control access of the user to any particular group 450.

Alternatively, the universal server 130 in one embodiment, among others, may prompt the user to upgrade the user's respective class of service marker to add the group 450 to their resource list 410. In one embodiment, among others, this upgrade may be facilitated by a charge to the user's account.

Finally, the rules field 490 may be used to provide an alternative way to control access to the group list 450. The database 250" administrator may use this field to add various users of the universal server 130 to a list of those permitted to access the group list 450. Moreover, it can be used to further defined other fields of the group list 450. For example, a rule may be written whereby one of the attributes of the group could be to show the group to a certain subgroup of users.

Figure 5:
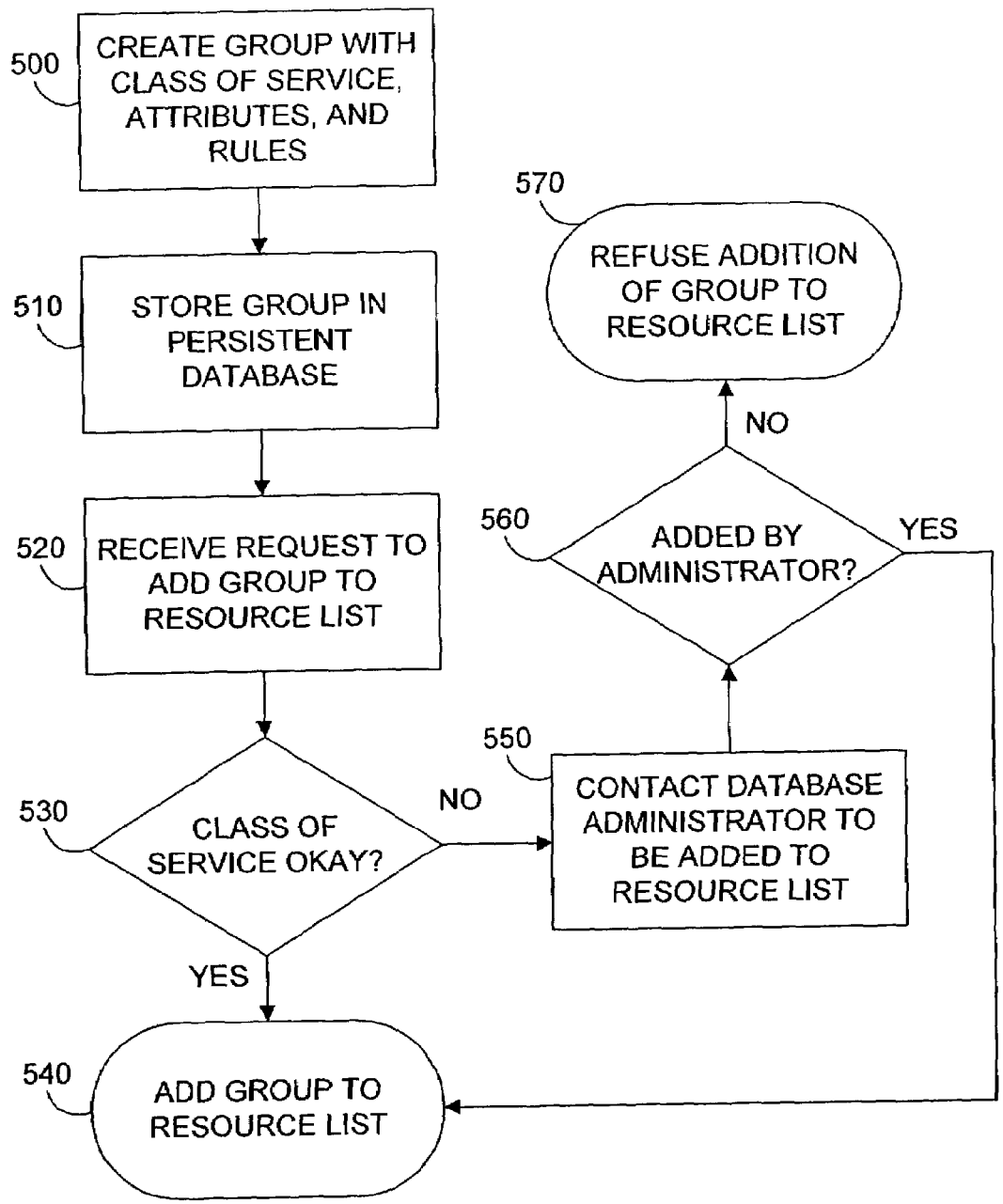
FIG. 5 is a flowchart illustrating operation of the system of FIG. 3.

Referring now to FIG. 5, shown is one embodiment, among others, of a flowchart illustrating operation of the system of FIG. 3. The first step 500 is for an administrator to create a group list using the administrative application tool, adding attributes and class of service requirements under the group. After the group has been created, in the next step 510, the group is stored in the persistent database. In accordance with the next step 520, the database receives a request to add the group to a resource list corresponding to a user. The database 250 then checks to see that the class of service marker associated with the particular using wishing to add the group is sufficient in step 530. If the class of service marker is sufficient, the next step 540 is to add the group 430 to the resource list 410.

If the class of service marker is insufficient to add the group 430 to the resource list 410 of the user, the next step 550 can be to send a request to the database 250 administrator to request that the user be allowed to add the group 430 to their resource list 410. The administrator may, in the next step 560, add the user to the rules 490 allowing the user to add the group 430 to their resource list 410. Alternatively, the administrator may decline the user, in which case the user is refused permission, according to step 570, to allow the group 430 to their resource list 410.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A system for limiting group access, comprising:
a group access management system operable to store a plurality of resource lists, the resource lists comprising resources whose network statuses are able to be monitored by respective users, such resources comprising individual contacts for other users, network applications, at least one group contact, and at least one group comprising a plurality of members, said at least one group further comprising a group class of service marker associated with said at least one group and at least one rule for indicating network presence of the group contact based upon a subset of the plurality of members being present on a network, a resource list of a user being a persistent list of resources that are authorized to be accessed by the user, where a non-persistent list of current network statuses for the resources in the resource list are provided to the user;
a service manager configured to keep track of presence information for the user and roster information for the resources contained in the resource list of the user and alert the user as to a change in state of presence and roster information; and
a network service router coupled to the group access management system and being operable to route a service request for adding a group contact to the resource list of the user, the service request being granted, if the service request includes an adequate class of service marker with respect to the group class of service marker so that the user can view the current network status of the group contact after the group contact is added to the resource list of the user, the network service router being further configured to route a request for presence or roster information to the service manager.

2. The system of claim 1, wherein said at least one group further comprises a second rule.

3. The system of claim 2, wherein the service manager is coupled to the network service router and operable to retrieve said at least one group from the group access management system and execute the second rule, showing said at least one group as accessible in response to the second rule.

4. The system of claim 2, wherein the rule comprises indicating the group is accessible in response to a particular subset of said plurality of members of said at least one group being accessible.

5. The system of claim 2, wherein the rule comprises indicating the group is accessible in response to all members of said at least one group being accessible.

6. The system of claim 2, wherein the rule comprises indicating the group is accessible in response to any member of said at least one group being accessible.

7. The system of claim 1, wherein the group further comprises a show group status.

8. The system of claim 7,
wherein the service manager is coupled to the network service router, and, responsive to the show group status, is operable to notify a plurality of users about said at least one group contact.

9. The system of claim 7, further comprising:
a means for hiding said at least one group contact based upon the show group status.

10. The system of claim 1, wherein an administrator creates and edits said at least one group.

11. The system of claim 10, wherein a user associated with the resource list must request from the administrator permission to add said at least one group contact to the resource list associated with the user.

12. The system of claim 11, wherein the user is automatically added to said at least one group upon permission from the administrator.

13. The system of claim 1, wherein an owner of said at least one group creates and edits said at least one group.

14. The system of claim 13, wherein a user must request from the owner permission to add said at least one group contact to the resource list associated with the user.

15. The system of claim 1, wherein a central administrator controls the ability of a plurality of users to add said at least one group contact to a plurality of resource lists associated with the plurality of users.

16. The system of claim 15, wherein the central administrator controls the addition of said at least one group contact to a plurality of resource lists through a comparison of a class of service marker associated with a user of a resource list and the group class of service marker associated with said at least one group.

17. The system of claim 15, wherein the central administrator controls the addition of said at least one group contact to a plurality of resource lists through authorizing individual users to add said at least one group contact.

18. The system of claim 15, wherein the central administrator controls the addition of said at least one group contact to a plurality of resource lists through limiting the addition of said at least one group contact to members of said at least one group.

19. The system of claim 1, wherein said at least one group further comprises a group attribute associated with said at least one group.

20. The system of claim 19, wherein said group attribute comprises a mask to prevent the group contact from being viewable by other network users.

21. The system of claim 19, wherein said group attribute allows every user to view said at least one group contact.

22. A method for managing group access, comprising:
creating a group comprising a plurality of members;
storing the group in a group access management system on a network; and
assigning a class of service level to the group, wherein the group is allowed to be added to a profile of a user if the user has a class of service at, at least the class of service level for the group, the profile comprising resources whose network statuses are able to be monitored by the users, such resources comprising individual contacts for other users, network applications, and at least one group, an electronic chat client of the user being configured to communicate with members of the group after the group is added to the profile of the user, network presence for the group being determined based upon a subset of the plurality of members being present on the network, wherein a non-persistent list of current network statuses for resources in the profile are provided to the user and the non-persistent list includes the network status of the group after the group is added to the profile of the user such that the user can view the current network status of the group;
tracking presence information for the user and roster information for the resources contained in the profile of the user via a service manager and alerting the user as to a change in state of presence and roster information;
routing a service request for adding a group contact to the resource list of the user to the service manager, wherein the service is to be granted if the service request includes an adequate class of service marker with respect to the group class of service marker so that the user can view the current network status of the group contact after the group contact is added to the resource list of the user; and
routing a request for presence or roster information to the service manager.

23. The method of claim 22, further comprising:
receiving a request from a user to add the group to a profile associated with the user and stored in the group access management system.

24. The method of claim 23, further comprising:
checking a class of service marker associated with the user; and
adding the group to the profile in response to the class of service marker.

25. The method of claim 23, further comprising:
receiving a permission from an administrator of the group access management system; and
adding the group to the profile upon receiving permission from the administrator.

26. The method of claim 23, further comprising:
denying addition of the group to the profile without a permission from an administrator of the group access management system.

27. The method of claim 22, further comprising:
assigning a rule to the group.

28. The method of claim 27, further comprising:
receiving a request for a status with respect to the group;
executing the rule; and
updating the status base upon a result of executing the rule.

29. The method of claim 27, wherein the rule comprises:
waiting for a subset of members of the group to be accessible before indicating a status of accessible for the group.

30. The method of claim 29, wherein the subset comprises at least one person.

31. The method of claim 29, wherein the subset comprises a particular subset of members of the group.

32. The method of claim 27, wherein the rule comprises:
waiting for all members of the group to be accessible before indicating a status of accessible for the group.

33. The method of claim 22, further comprising:
assigning a show group status.

34. The method of claim 33, wherein the show group status indicates whether or not a plurality of non-member users may view the group.

35. The method of claim 22, further comprising:
granting a special permission to a specific user to add the group to a resource list associated with the specific user without requiring a class of service marker.

36. The method of claim 22, further comprising:
assigning an attribute to the group.

37. The method of claim 36, further comprising:
using the attribute to mask the group from a plurality of non-member users.

38. A method for adding a group to a resource list, comprising:
sending a request over a network to add a group to a user resource list, the group comprising a plurality of members, a resource list of a user being a persistent list of resources that are authorized to be accessed by a user, where a non-persistent list of current network statuses for the resources in the resource list are provided to the user, wherein the resource list comprises resources whose network statuses are able to be monitored by the users, such resources comprising individual contacts for other users, network applications, and at least one group;

providing a class of service marker associated with the user making the request; and adding the group to the user resource list if the class of service marker allows the group to be added so that the user can view the current network status of the group contact after the group contact is added to the resource list of the user, an electronic chat client of the user being configured to communicate with members of the group after the group is added to the user resource list of the user, network presence for the group being determined based upon a subset of the plurality of members being present on the network, wherein a service manager tracks presence information for the user and roster information for the resources contained in the resource list of the user; alerts the user as to a change in state of presence and roster information and handles requests for presence or roster information.

39. The method of claim 38, further comprising:

sending a request to an administrator for special permission when the class of service marker does not allow the group to be added.

40. The method of claim 39, further comprising:

receiving special permission from the administrator.

41. The method of claim 40, further comprising:

adding the group to the user resource list using the special permission.

42. The method of claim 38, further comprising:

setting a rule associated with the group.

43. The method of claim 42, further comprising:

using the rule to indicate accessibility of the group when a subset of members of the group are accessible.

* * * * *